United States Patent [19]
Uno et al.

[11] 3,824,612
[45] July 16, 1974

[54] MECHANISM FOR INDICATING CONDITION OF OPERABILITY OF AN ELECTRICALLY CONTROLLED CAMERA SHUTTER

[75] Inventors: Naoyuki Uno, 7-6, Kumano-cho; Katsuhiko Nomura, 38-6 Tsukiyashi-cho, both of Kawagoe, Japan

[22] Filed: Sept. 12, 1973

[21] Appl. No.: 396,946

[30] Foreign Application Priority Data
Sept. 19, 1972  Japan .............................. 47-93236

[52] U.S. Cl. ................................. 354/266, 354/50
[51] Int. Cl. ...................... G03b 9/08, G03b 17/18
[58] Field of Search . 95/10 C, 10 CT, 53 R, 53 EA, 95/53 EB

[56] References Cited
UNITED STATES PATENTS
3,349,678  10/1967  Suzuki et al. ................ 95/53 EB X
3,435,745  4/1969  Fukushima ...................... 95/53 EB
3,601,019  8/1971  Uitai .............................. 95/53 E X
3,690,228  9/1972  Yamashita et al. ............... 95/10 C

*Primary Examiner*—Joseph F. Peters
*Attorney, Agent, or Firm*—Wolder & Gross

[57] ABSTRACT

A mechanism for preventing the opening of a shutter in a camera having an electronic shutter control network in the event of insufficient battery voltage or a defect in the control, includes a solenoid which is energized upon the initiation of, but before the shutter opening release operation, to releasably lock the shutter closing operation by the attraction and advance of the solenoid armature. A shutter release member is operatively coupled by a lever to the latch member of the shutter opening mechanism upon sufficient solenoid retention of the armature in advanced position and the solenoid release of the armature effects the release of the lever to a position uncoupling the shutter release member from the latch member. A voltage discriminating circuit couples the shutter control network to the solenoid.

9 Claims, 4 Drawing Figures

PATENTED JUL 16 1974 3,824,612

AUTOMATIC EXPOSURE CIRCUIT — VOLTAGE DISCRIMINATING CIRCUIT

MECHANISM FOR INDICATING CONDITION OF OPERABILITY OF AN ELECTRICALLY CONTROLLED CAMERA SHUTTER

BACKGROUND OF THE INVENTION

The present invention relates generally to improvements in cameras having electronic shutter control, and it relates more particularly to an improved mechanism for providing in a camera having an electronic shutter control in which an indication is afforded of a deficiency in the electric power source, or a defect in the shutter control.

A conventional type of electronic shutter control in a camera employs a solenoid whose energization releasably locks the shutter in its open position following its opening and whose deenergization, by the electronic shutter control or timing network, releases the shutter to its closed condition. The shutter control is usually responsive to the light incident on a photosensitive element. The accurate and precise operation of the electronic control network depends not only on the absence of any defects in the network, but also on the proper state of the energizing battery, in that the battery is of sufficient voltage under load. It is a common expedient to provide such cameras with a battery voltage indicator by which the closing of a switch ignites a lamp, thereby indicating the adequacy of the battery. However, such expedience possesses numerous drawbacks and disadvantages. It is highly inconvenient, since it requires an additional manipulation for each photographic sequence, the closing of the switch and the observation of a light, it is time and electric power consuming, it interferes with rapid sequence photography and otherwise leaves much to be desired.

SUMMARY OF THE INVENTION

It is a principal object of the present invention to provide an improved camera shutter control mechanism.

Another object of the present invention is to provide an improved electronically controlled camera shutter having a mechanism which affords an indication of the inoperativeness of the electronic control consequent to a defect therein, or the deficiency of the energizing battery.

Still another object of the present invention is to provide an electronically controlled camera shutter mechanism in which the shutter release is prevented in the event of a defect in the mechanism, or a deficiency in the energizing battery.

A further object of the present invention is to provide an improved mechanism of the above nature, characterized by its reliability, ruggedness, convenience and great versatility and adaptability.

The above and other objects of the present invention will become apparent from a reading of the following description taken in conjunction with the accompanying drawing which illustrates preferred embodiments thereof.

In a sense, the present invention contemplates the provision of, in a camera including a shutter and an electric exposure control network and a shutter opening, a closing mechanism, a solenoid, including an armature moveable to a retracted position and advanced and retained by a predetermined energization of the solenoid, to lock the shutter closing mechanism, a shutter opening release member, motion transmission means for actuating the shutter opening mechanism to open the shutter in response to the advance of the shutter release member, and means responsive to the retained advanced position and to the solenoid release of the armature for respectively enabling and disabling the motion transmission means to respectively permit and prevent the opening of the shutter with the advance of the shutter release member.

In the preferred form of the improved mechanism as applied to a single lens reflex having a spring closed mirror latching member, whose opening releases the mirror to a retracted position in which it releases the shutter to its open position. A slide member pivotally supports at one end a first lever, having a first end registering with the latch member and its opposite end registering with a pin on a spring retracted manually operable shutter release member. The other end of the slide member is pivoted to one end of a swingable second lever, whose opposite end registers with the solenoid armature, so that with sufficient energization of the solenoid consequent to an adequate power supply, the solenoid advanced armature retains the slide member in raised position, whereby advance of the shutter release member swings the first lever to open the latch member and effect the shutter opening. On the other hand, when the solenoid is deenergized or insufficiently energized, an indication of the power supply inadequacy or a control circuit defect, the advance of the shutter release member swings the second lever which raises the released slide member which requires less force than the tripping of the spring biased latching member, thereby preventing the opening of the shutter and providing an indication of the inadequacy of the electric energizing source, or a defect in the power circuit. The solenoid is advantageously coupled to the shutter control network through a voltage discriminating circuit, which may be a sharp cut-off switch, in which there is a sharp difference in output, for example, from cut-off to full power, with a small change in the signal input.

The improved mechanism is reliable, rugged and simple, is highly convenient in use and consumes no time and additional electrical energy.

DESCRIPTION OF THE PREFERRED EMBODIMENTS

Figure 1:
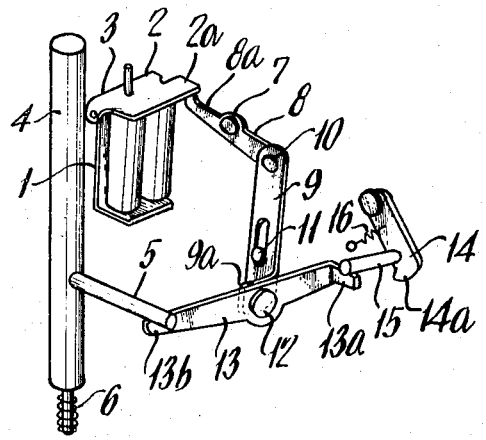
FIG. 1 is a perspective view of a preferred embodiment of the present invention under normal operating conditions.
Figure 2:
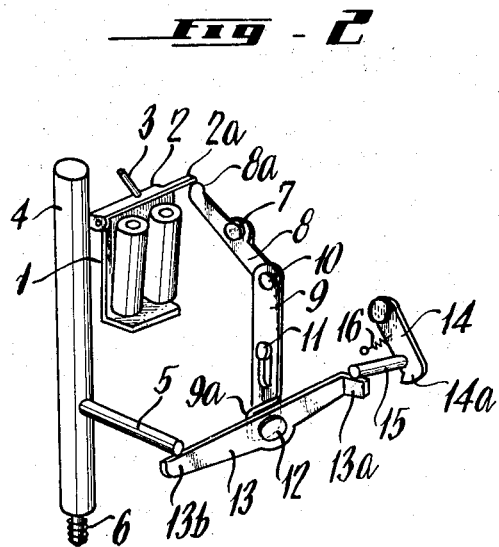
FIG. 2 is a view similar to FIG. 1, with the mechanism in an abnormal condition providing a warning indication.

Referring now to the drawings, particularly FIGS. 1 and 2 thereof, which illustrate a preferred embodiment of the present invention, the reference numeral 1 generally designates a solenoid or electromagnet whose energization is controlled by a conventional automatic electric exposure control network, in which the solenoid 1 is energized at the early stage of depression or advance of the shutter opening release member, and before the actuation of the shutter release, and in which the solenoid is deenergized after the exposure interval to release the open shutter to its closed condition. Associated with the solenoid 1 is swingable armature 2, actuated by the energized solenoid 1 and having a laterally projecting finger 2a and an upwardly projecting pin 3, which, in the armature solenoid actuated position releasably retains the shutter follower curtain or closing sequence in its open position, and upon deenergization of the solenoid 1, releases the curtain to close the shutter in the known manner.

A manually controlled or advanceable shutter release rod 4 is axially moveable and is biased to its raised or retracted position by a compressing spring 6 bearing on a bottom shoulder of rod 4. A finger 5 projects radially from the lower part of rod 4.

A pivoted latch member defining lever or arm is swingable between a releasable position locking the mirror in a single lens reflex camera in its retracted viewing condition and a position releasing the mirror for swinging under the influence of drive means to its advanced position, permitting a film exposure sequence. A spring 16 urges the latch member 14 counter clockwise to its lock position. It should be noted, as is well known, the movement of the mirror to its advanced position effects the advance of the shutter leading curtain, or otherwise effects the opening of the shutter.

A vertical slide member 9 is provided with a longitudinal slot engaged by a guide pin 11 to permit the longitudinal movement of slide member 11. The slide member 9 terminates at its bottom in a perpendicular lug 9a, to which is swingably connected by a pivot pin 12, a horizontally extending lever 13 engaged by pivot pin 12 between the ends of lever 13. One end 13b of lever 13 underlies the shutter release pin 5, and/ the other end terminates in an ear 13a underlying a pin 15 mounted on latch member arm 14.

The upper end of slide member 9 is coupled by a pivot pin 10 to one end of a lever 8, which is swingably mounted between its end by a pivot pin 7 to a fixed point in the camera, the other end of lever 8 terminating in an upwardly directed projection 8a underlying the armature finger 2a. It should be noted that when the lever 13 is maintained in its raised position by way of slide member 9, lever 8 and the solenoid actuated armature 2, the depression of shutter release member 4 swings lever 13 counter clockwise about pivot 12 to unlock latch member 14, as shown in FIG. 1, and effects the shutter opening sequence. On the other hand, if the armature 2 is not retained by solenoid 2 in its actuated advanced position, by reason of insufficient or no energization of solenoid 1, the depression of shutter release member swings lever 13 counter clockwise about pin 15 as a fulcrum, by reason of the greater force required to swing latch member 14 against the loading thereof, and the influence of spring 16, to raise slide member 9, swing lever 8 counter clockwise and retract armature 2, if it has not been previously retracted, as shown in FIG. 2.

Considering now the operation of the mechanism described above, under normal conditions as shown in FIG. 1 the electromagnet or solenoid 1 strongly attracts the armature 2, so that the lever 8 and the pivot pins 10, 12, are maintained stationary since the armature 2 is firmly retained in its actuated position under the action of electromagnet 1. As the rod 4 is depressed from its retracted state, the lever 13 associated with shutter release is driven by the pin 5 so as to be rotated around the pivot pin 12 counter clockwise, as seen in FIG. 1, and the lever 13, in turn, drives by its end ear 13a the pin 15, with the result that the mirror locking lever 14 is rotated counter clockwise as seen in FIG. 1, and the lever for activation of the mirror (schematically shown) is released. It is well known that the activation of the so called quick return mirror mechanism not shown, causes the shutter release.

Now, as shown in FIG. 2, which illustrates the condition wherein the shutter release rod 4 has been depressed as seen in this figure, and where the electromagnet 1 is insufficiently or not energized consequent to a depleted battery or deficient mechanism, the lever 13, the member 11 and the lever 8 are rotated substantially around the end 13a of the lever 13 since a locking force such as friction caused from locking of the mirror by the lever 14 is higher than the force of the other elements, such as the spring biasing the armature to restore it to its initial position. As a result, movement of the release rod 4 does not cause a movement of the lever 14. Thus, no shutter release is effected when the operation of shutter release is attempted by members such as the release button from the exterior of the camera body and this fruitless operation indicates to the user that there is some disorder in the mechanism such as the electric power source.

Figure 4:
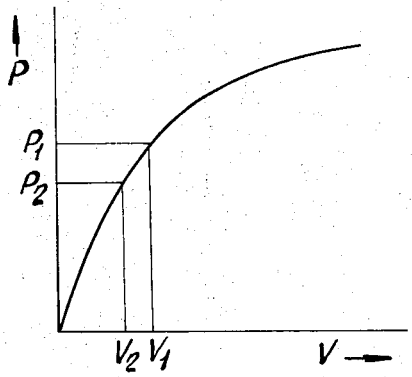
FIG. 4 is a graph illustrating the relationship between the solenoid applied voltage and the armature holding force.

With the arrangement and mechanism described above, the absence of shutter release upon depression of shutter release member 4 alerts the operator to a deficiency in the mechanism, such as an opening or disconnection in the electromagnet coil or solenoid, or in some other electric circuit and, in addition, also functions as a check for an excessive reduction of the value of the source voltage. With respect to a reduction of the source voltage, the relationship between the holding force of the electromagnet and the energization voltage is, as seen in FIG. 4, such that the holding force sharply reduces at a level of the voltage lower than a predetermined value and such a reduction is never gradual. To provide a device according to the present invention which operates with greater precision and reliability, an arrangement may be provided such that the determination of the reaction or the transfer between shutter operative and unoperative conditions is performed in the range of voltage variation in which a sharp reduction of voltage appears (voltage $V_1$ is the minimum voltage necessary for activation of the circuit while voltage $V_2$ is the voltage at which the electromagnet cannot attract the armature).

Figure 3:
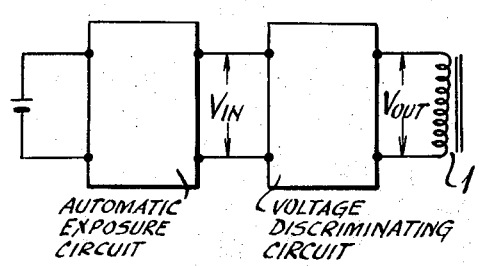
FIG. 3 is a block diagram of a modified circuit in accordance with the present invention.

The device, according to the present invention, will operate more positively and precisely, when a voltage discriminating circuit is inserted into the electric circuit for the energization of the electromagnet 1 so that the electromagnet is energized only when the discriminating circuit detects or senses the appropriate voltage. A preferred embodiment of such an arrangement is shown by FIG. 3. The discriminating circuit arrangement is such that an output voltage therefrom, $V_{out}$, which is approximately zero is obtained when the input $V_{in}$ to the voltage discriminating circuit is lower than a suitable or satisfactory system operating voltage $V_1$ (this arrangement may be easily achieved by employing a sharp cut-off switching circuit using elements such as an FET) and may be added as shown in the embodiment of FIG. 3 and used with the mechanism of the embodiment shown by FIG. 1 for operation with much higher precision.

While there have been described and illustrated preferred embodiments of the present invention, it is apparent that numerous alterations, additions and omissions may be made without departing from the spirit thereof.

We claim:

1. In a camera including a shutter and an electric exposure control network and a shutter opening and closing mechanism, a solenoid including an armature moveable to a released retracted position and to an advanced and retained position by a predetermined energization of said solenoid to releasably lock said shutter closing mechansim, a shutter opening release member, motion transmission means for actuating said shutter opening mechanism to open said shutter in response to the advance of said shutter release member, and means responsive to the retained advanced position and the release of said armature by said solenoid for enabling and disabling respectively said motion transmission means to respectively permit and prevent the opening of said shutter with the advance of said shutter release member.

2. The camera of claim 1, wherein said shutter opening mechanism includes a latching member moveable between shutter opening lock and unlock positions, and said motion transmission means comprises a motion transmission member moveable between an enabled position transmitting motion from said shutter release member to said latching member, and a disabled non-transmitting position in response to the advance and release of said armature respectively.

3. The camera of claim 2, wherein said motion transmission member comprises a lever pivoted for swinging about a point between the ends thereof, the ends of said lever registering with said shutter release member and said latch member.

4. The camera of claim 3, said enabling and disabling means comprising means for moving said pivot point in response to the advance and retraction of said armature.

5. The camera of claim 3, wherein said enabling and disabling means comprises a slide member supporting said lever, and a second lever swingable between the ends thereof and pivoted at a first end to said slide member and having its opposite end engaging said armature.

6. The camera of claim 2 wherein said camera is a single lens reflex camera including a mirror swingable between an advanced viewing position and a retracted picture taking position, said latching member releasably locking said mirror in its retracted position locking said shutter in its closed cocked position.

7. The camera of claim 1 including a voltage discriminating circuit having an output connected to said solenoid and an input controlled by said exposure control network.

8. A safety device against a disorder of a power source in a photographic camera having an electric shutter wherein demagnetization of an electromagnet is utilized for starting of shutter closure or exposure time control, comprising a member for shutter release arranged so that a circuit of the electromagnet is closed at an early stage of shutter release operation, a member associated with shutter release adapted to be activated by said shutter release member for removal of locking effect upon the shutter or the mirror, and a member engaged with a moveable piece of the electromagnet for exposure time control, said last mentioned member having a rotatable shaft of said member associated with shutter release mounted thereon, in such a manner that said rotatable shaft of the member associated with shutter release is prevented against rotation and the shutter release is effected when the electromagnet normally operates and the moveable piece is held while said rotatable shaft of the member associated with shutter release is rotated and no shutter release may occur when said moveable piece is in moveable condition without being attracted by the electromagnet due to factors such as disorder of the power source since the locking effect upon the shutter or the mirror is relatively high.

9. A safety device against a disorder of a power source in a photographic camera having an electric shutter according to claim 8, further includng a voltage discriminating circuit inserted into an electric circuit for energization of the electromagnet, such that said electromagnet cannot attract the moveable piece at the voltage of energization lower than the level necessary for exposure time control and any operation of shutter release cannot release the shutter.

* * * * *

UNITED STATES PATENT OFFICE
CERTIFICATE OF CORRECTION

Patent No. 3,824,612            Dated July 16, 1974

Inventor(s) Naoyuki Uno and Katsuhiko Nomura

It is certified that error appears in the above-identified patent and that said Letters Patent are hereby corrected as shown below:

--[73] Assignee: Asahi Kogaku Kogyo Kabushiki Kaisha
                      Japan --

Signed and Sealed this twentieth Day of April 1976

[SEAL]

Attest:

RUTH C. MASON
*Attesting Officer*

C. MARSHALL DANN
*Commissioner of Patents and Trademarks*